United States Patent
Otsuki et al.

(10) Patent No.: US 8,104,266 B2
(45) Date of Patent: Jan. 31, 2012

(54) EXHAUST PURIFICATION DEVICE OF INTERNAL COMBUSTION ENGINE

(75) Inventors: Hiroshi Otsuki, Susono (JP); Takamitsu Asanuma, Mishima (JP); Kohei Yoshida, Gotenba (JP); Hiromasa Nishioka, Susono (JP); Shinya Hirota, Susono (JP); Kotaro Hayashi, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 608 days.

(21) Appl. No.: 12/308,947

(22) PCT Filed: Apr. 30, 2008

(86) PCT No.: PCT/JP2008/058596
§ 371 (c)(1),
(2), (4) Date: Dec. 30, 2008

(87) PCT Pub. No.: WO2008/143022
PCT Pub. Date: Nov. 27, 2008

(65) Prior Publication Data
US 2009/0320451 A1    Dec. 31, 2009

(30) Foreign Application Priority Data

May 16, 2007  (JP) ................................. 2007-130575

(51) Int. Cl.
*F01N 3/00* (2006.01)
(52) U.S. Cl. ................................ 60/276; 60/295; 60/297
(58) Field of Classification Search .................... 60/276, 60/285, 295, 297
See application file for complete search history.

(56) References Cited

U.S. PATENT DOCUMENTS
2007/0065341 A1    3/2007    Asanuma

FOREIGN PATENT DOCUMENTS
| JP | A-2000-230419 | 8/2000 |
| JP | A-2004-239706 | 8/2004 |
| JP | A-2005-351179 | 12/2005 |
| JP | A-2005-351181 | 12/2005 |

*Primary Examiner* — Thomas E. Denion
*Assistant Examiner* — Diem Tran
(74) *Attorney, Agent, or Firm* — Oliff & Berridge, PLC

(57) ABSTRACT

In an internal combustion engine, an $SO_x$ sensor (16) having a sensor part (53, 60) trapping the $SO_x$ contained in the exhaust gas and able to detect the amount of $SO_x$ trapped at the sensor part (53, 60) from a change of property of the sensor part (53, 60) is arranged in the engine exhaust passage upstream of the $NO_x$ storing catalyst (14). When estimating the amount of $SO_x$ stored in the $NO_x$ storing catalyst (14) from the amount of $SO_x$ trapped at the sensor part (53, 60), deviation of the estimated value of the amount of stored $SO_x$ arising due to the difference between the $SO_x$ trapping rate of the sensor part (53, 60) and the $SO_x$ trapping rate of the $NO_x$ storing catalyst (14) is corrected.

11 Claims, 10 Drawing Sheets

(A)

(B)

(C)

(A)

(B)

(C)

(D)

(A)

(B)

(A)

(B)

(C)

(A)

(B)

EXHAUST PURIFICATION DEVICE OF INTERNAL COMBUSTION ENGINE

TECHNICAL FIELD

The present invention relates to an exhaust purification device of an internal combustion engine.

BACKGROUND ART

In the past, there have been known $SO_x$ concentration sensors for detecting the $SO_x$ concentration in the exhaust gas. These known $SO_x$ concentration sensors normally use solid electrolytes and measure the electromotive force generated by the change of $SO_x$ into sulfate ions to detect the $SO_x$ concentration in the exhaust gas (for example, see Japanese Patent Publication (A) No. 2004-239706).

However, a conventional $SO_x$ detection system using this kind of $SO_x$ concentration sensor can only operate under high temperatures and becomes bulky as an apparatus. In particular, when the $SO_x$ concentration is low, there is the large problem of not being able to detect the $SO_x$ concentration. Conventionally, as in this $SO_x$ concentration sensor, attention has only been directed at instantaneously detecting the $SO_x$ concentration. So long as trying to instantaneously detect the $SO_x$ concentration in such a way, various problems inevitably occur like as explained above.

Therefore, the inventors changed their way of thinking and focused not on instantaneously detecting the $SO_x$ concentration, but on detecting the cumulative amount of sulfur $SO_x$ released over a long period. Further, by changing their thinking in this way, it became possible to easily detect the cumulative amount of the $SO_x$ exhausted over a long period of time and possible to estimate the amount of $SO_x$ stored in the catalyst arranged in the engine exhaust passage from this cumulative amount of the $SO_x$.

However, it was learned that, when estimating the amount of $SO_x$ stored in the catalyst from the cumulative amount of the $SO_x$, if not considering the $SO_x$ trapping rate when detecting the cumulative amount of the $SO_x$ and the $SO_x$ trapping rate of the catalyst, the estimated value of the stored amount of $SO_x$ ended up deviating from the normal value.

DISCLOSURE OF THE INVENTION

An object of the present invention is to provide an exhaust purification device of internal combustion engine able to easily estimate the amount of $SO_x$ stored in a catalyst.

According to the present invention, there is provided an exhaust purification device of internal combustion engine arranging a catalyst in which $SO_x$ contained in an exhaust gas is trapped and stored in an engine exhaust passage, wherein an $SO_x$ sensor having a sensor part trapping $SO_x$ contained in exhaust gas and able to detect an amount of $SO_x$ trapped at the sensor part from a change in a physical property of the sensor part is arranged in the engine exhaust passage upstream of the catalyst, and deviation correcting means for correcting deviation of an estimated value of a stored amount of $SO_x$ arising due to a difference in an $SO_x$ trapping rate of the sensor part and an $SO_x$ trapping rate of the catalyst when estimating the amount of $SO_x$ stored in the catalyst from the amount of $SO_x$ trapped at the sensor part is provided.

BEST MODE FOR CARRYING OUT THE INVENTION

Figure 1:
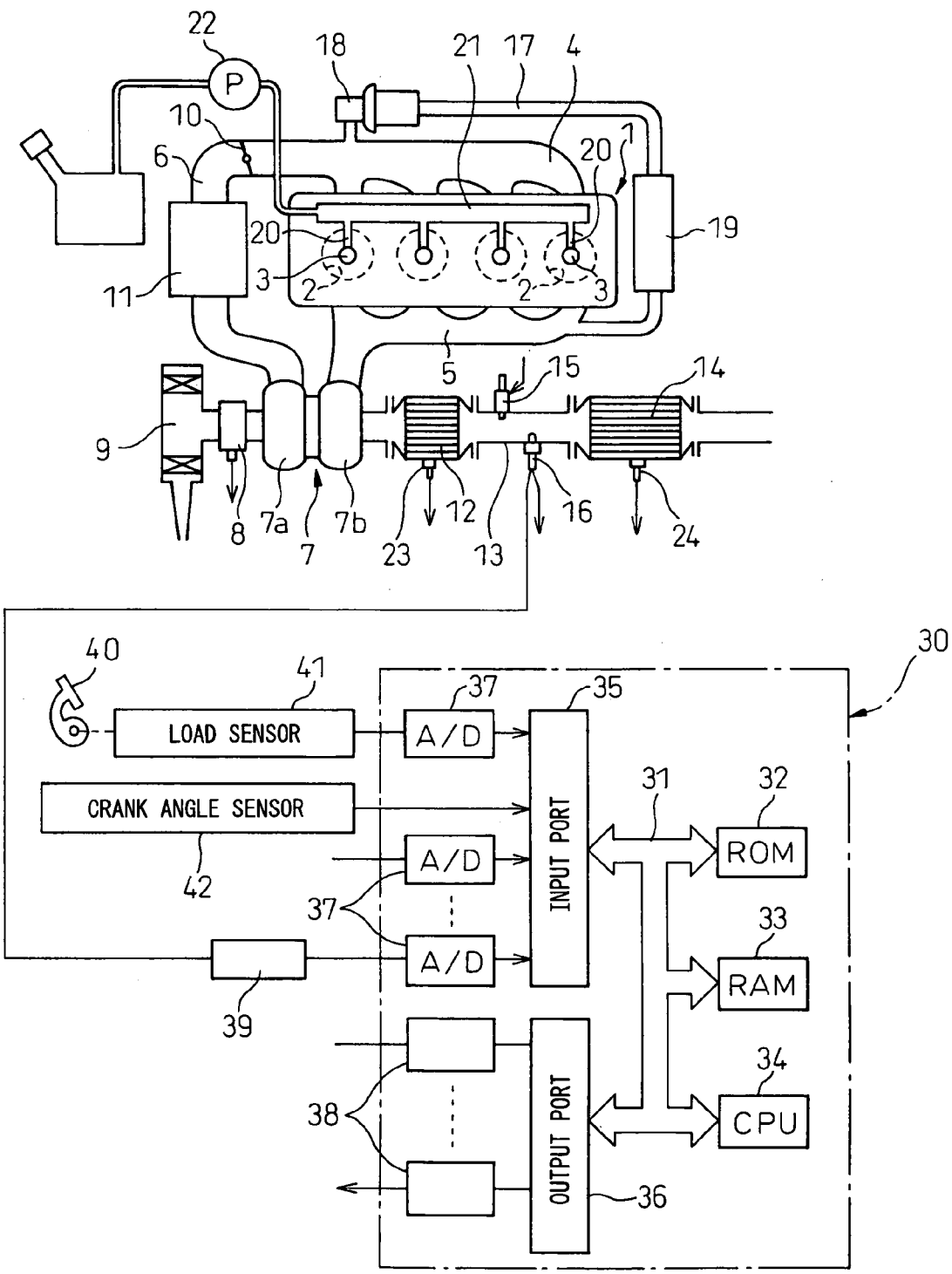
FIG. 1 is a view of a compression ignition type internal combustion engine.

FIG. 1 is an overview of a compression ignition type internal combustion engine.

Referring to FIG. 1, 1 indicates an engine body, 2 a combustion chamber of each cylinder, 3 an electronic control type fuel injector for injecting fuel into each combustion chamber 2, 4 an intake manifold, and 5 an exhaust manifold. The intake manifold 4 is connected through an intake duct 6 to the outlet of a compressor 7a of an exhaust turbocharger 7, while the inlet of the compressor 7a is connected through an intake air detector 8 to an air cleaner 9. Inside the intake duct 6 is arranged a throttle valve 10 driven by a step motor. Further, around the intake duct 6, a cooling device 11 for cooling the intake air flowing through the inside of the intake duct 6 is arranged. In the embodiment shown in FIG. 1, the engine coolant is guided into the cooling device 11 where the engine coolant cools the intake air.

On the other hand, the exhaust manifold 5 is connected to the inlet of an exhaust turbine 7b of the exhaust turbocharger 7, while the outlet of the exhaust turbine 7b is connected to the inlet of the $SO_x$ trap catalyst 12. Further, the outlet of the $SO_x$ trap catalyst 12 is connected through an exhaust pipe 13 to a catalyst 14 in which the $SO_x$ contained in the exhaust gas is trapped and stored. In the embodiment shown in FIG. 1, this catalyst 14 is comprised of an $NO_x$ storing catalyst. A reducing agent feed valve 15 for feeding a reducing agent comprised of for example a hydrocarbon into the exhaust gas flowing through the exhaust pipe 13 is attached to the exhaust pipe 13. Further, an $SO_x$ sensor 16 for detecting the $SO_x$ in the exhaust gas is arranged in the exhaust pipe 13.

The exhaust manifold 5 and the intake manifold 4 are connected with each other through an exhaust gas recirculation (hereinafter referred to as an "EGR") passage 17. Inside the EGR passage 17, an electronic control type EGR control valve 18 is arranged. Further, around the EGR passage 17, a cooling device 19 is arranged for cooling the EGR gas flowing through the inside of the EGR passage 17. In the embodiment shown in FIG. 1, the engine coolant is guided inside the cooling device 19 where the engine coolant cools the EGR gas. On the other hand, the fuel injectors 3 are connected through fuel feed pipes 20 to a common rail 21. Into this common rail 21, fuel is supplied from an electronic control type variable discharge fuel pump 22. The fuel supplied in the common rail 21 is supplied through the fuel feed pipes 20 to the fuel injectors 3.

The electronic control unit 30 is comprised of a digital computer provided with a ROM (read only memory) 32, RAM (random access memory) 33, CPU (microprocessor) 34, input port 35, and output port 36 all connected to each other by a bidirectional bus 31. A temperature sensor 23 for detecting the temperature of the $SO_x$ trap catalyst 12 is attached to the $SO_x$ trap catalyst 12, while a temperature sensor 24 for detecting the temperature of the $NO_x$ storing catalyst 14 is attached to the $NO_x$ storing catalyst 14. The output signals of the temperature sensors 23 and 24 and the intake air detector 8 are input through the corresponding AD converters 37 to the input port 35. Further, an output signal showing the temperature of the $SO_x$ sensor 16 is input through a corresponding AD converter 37 to an input port 35, while an output signal showing an amount of trapped $SO_x$ of the $SO_x$ sensor 16 is input to a detection circuit 39. The output signal of this detection circuit 39 is input through a corresponding AD converter 37 to the input port 35.

An accelerator pedal 30 is connected to a load sensor 41 generating an output voltage proportional to the depression amount L of the accelerator pedal 40. The output voltage of the load sensor 41 is input through a corresponding AD converter 37 to the input port 35. Further, the input port 35 has a crank angle sensor 42 generating an output pulse every time the crankshaft rotates by for example 15° connected to it. On the other hand, the output port 36 is connected to the fuel injectors 3, step motor for driving the throttle valve 10, reducing agent feed valve 15, EGR control valve 18, and fuel pump 22 through the corresponding drive circuits 38.

First, explaining the $NO_x$ storing catalyst 14 shown in FIG. 1, this $NO_x$ storing catalyst 14, for example, is comprised of a catalyst carrier made of alumina on which for example a precious metal catalyst comprised of platinum Pt and a layer of an $NO_x$ absorbent comprised of potassium K, sodium Na, cesium Cs, or other such alkali metal, barium Ba, calcium Ca, or other such alkali earth, or lanthanum La, yttrium Y, or other such rare earth is formed. If the ratio of the air and fuel (hydrocarbons) fed into the engine intake passage, combustion chambers 2, and exhaust passage upstream of the $NO_x$ storing catalyst 14 is referred to as the "air-fuel ratio of the exhaust gas", this $NO_x$ storing catalyst 14 performs an $NO_x$ absorption/release action such that the catalyst 14 absorbs the $NO_x$ when the air-fuel ratio of the exhaust gas is lean while releases the absorbed $SO_x$ when the concentration of oxygen in the exhaust gas falls.

In this way, when the air-fuel ratio of the exhaust gas is lean, that is, when the fuel is burned under a lean air-fuel ratio, the $NO_x$ in the exhaust gas is absorbed in the $NO_x$ storing catalyst 14. However, if the fuel continues to be burned under a lean air-fuel ratio, eventually the $NO_x$ storing catalyst 14 will end up becoming saturated in $NO_x$ absorption ability and therefore the $NO_x$ storing catalyst 14 will end up becoming unable to absorb any more $NO_x$. Therefore, in this embodiment of the present invention, before the $NO_x$ storing catalyst 14 becomes saturated in absorption ability, the reducing agent feed valve 15 feeds a reducing agent to thereby make the air-fuel ratio of the exhaust gas temporarily rich and thereby make the $NO_x$ storing catalyst 14 release the $NO_x$.

However, exhaust gas contains $SO_x$. When this $SO_x$ flows into the $NO_x$ storing catalyst 14, this $SO_x$ is absorbed in the $NO_x$ storing catalyst 14 where a stable sulfate is produced. However, this sulfate is stable and resistant to breakdown. By just making the air-fuel ratio of the exhaust gas rich, this sulfate remains as it is without breaking down. Therefore, inside the $NO_x$ storing catalyst 14, the sulfate increases along with the elapse of time. Therefore, the amount of $NO_x$ which the $NO_x$ storing catalyst 14 can absorb falls along with the elapse of time. That is, the $NO_x$ storing catalyst 14 suffers from $SO_x$ poisoning.

Therefore, in this embodiment of the present invention, an $SO_x$ trap catalyst 12 is arranged upstream of the $NO_x$ storing catalyst 14 and this $SO_x$ trap catalyst 12 is used to trap the $SO_x$ contained in the exhaust gas and thereby prevent $SO_x$ from flowing into the $NO_x$ storing catalyst 14.

This $SO_x$ trap catalyst 12 is comprised of a substrate on which a coated layer is formed. On the surface of this coated layer, a precious metal catalyst is carried dispersed. In the embodiment shown in FIG. 1, platinum is used as the precious metal catalyst. As the ingredient forming the coated layer, for example, at least one element selected from potassium K, sodium Na, cesium Cs, and other such alkali metals, barium Ba, calcium Ca, and other such alkali earths, lanthanum La, yttrium Y, and other such rare earths is used.

This $SO_x$ trap catalyst 12 traps substantially 100 percent of the $SO_x$ contained in the exhaust when the amount of trapped $SO_x$ is still small. However, when the amount of trapped $SO_x$ becomes greater, the $SO_x$ trap catalyst 12 releases $SO_x$ when the $SO_x$ trap catalyst 12 becomes high in temperature etc. The released $SO_x$ flows into the $NO_x$ storing catalyst 14. As a result, the $NO_x$ storing catalyst 14 ends up being poisoned by the $SO_x$.

In this case, it is necessary to detect to what extent the $NO_x$ storing catalyst 14 has been poisoned by $SO_x$. However, it is impossible to detect the amount of $SO_x$ stored in the $NO_x$ storing catalyst 14. Therefore, in the present invention, an $SO_x$ sensor 16 is used to estimate the amount of $SO_x$ stored in the $NO_x$ storing catalyst 14.

Figure 2:
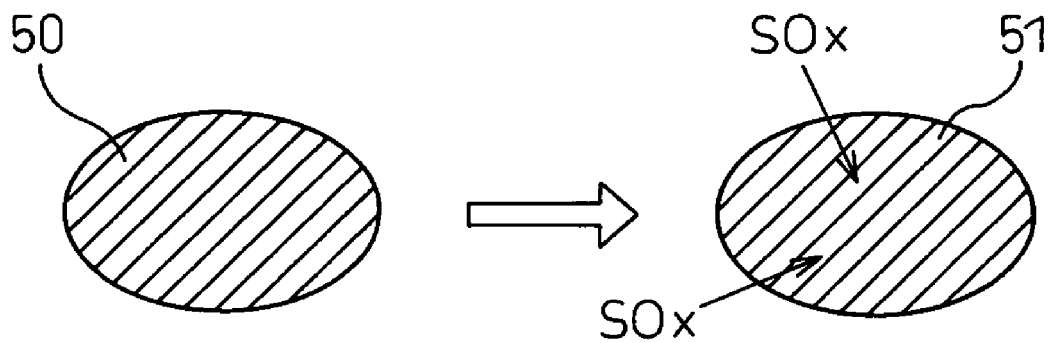
FIG. 2 is a view for explaining the principle of detection of $SO_x$.
Figure 2:
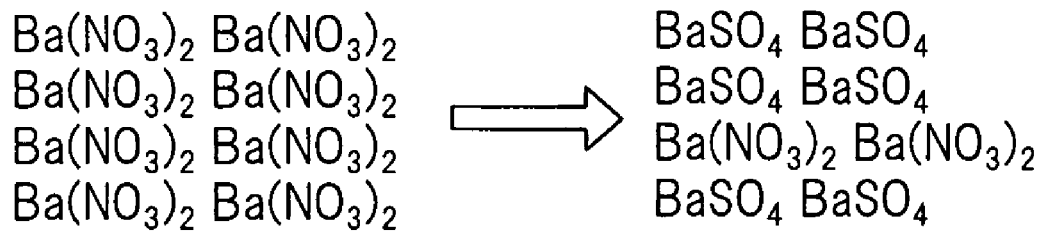
Figure 2:
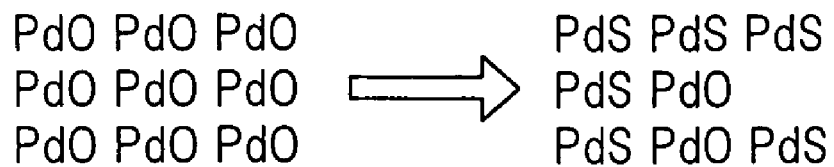

Next, referring to FIG. 2, the principle of detection of $SO_x$ according to the present invention will be explained. The sensor part of the $SO_x$ sensor 16 is formed from a metal or metal compound able to trap the $SO_x$ in the exhaust gas. The metal or metal compound forming the sensor part of this $SO_x$ sensor 16 is schematically shown by the notation 50 in FIG. 2(A). The metal or metal compound 50 shown in FIG. 2(A) is comprised of a metal or metal compound not including sulfur. In this embodiment of the present invention, this metal or metal compound 50 is comprised of an alkali metal, alkali earth metal, rare earth metal, precious metal, or compounds of these metals.

Next, the method of detection of the sulfur component will be explained taking as an example the case of using, as this metal or metal compound 50, an alkali earth metal, that is, barium Ba, or its compound.

Barium Ba becomes barium oxide BaO in the atmosphere. In particular, in the presence of water, it becomes barium hydroxide $Ba(OH)_2$. This barium oxide BaO or barium hydroxide $Ba(OH)_2$ is immediately changed to barium carbonate $BaCO_3$ by the CO or $CO_2$ contained in the exhaust gas when placed in the exhaust gas. Further, this barium carbonate $BaCO_3$ is changed to barium nitrate $Ba(NO_3)_2$ by the $NO_x$ contained in the exhaust gas.

That is, when barium Ba is used, the metal or metal compound 50 shown in FIG. 2(A) is barium oxide BaO, barium hydroxide $Ba(OH)_2$, barium carbonate $BaCO_3$, or barium nitrate $Ba(NO_3)_2$. When this metal or metal compound 50 is placed in the exhaust gas, it becomes barium nitrate $Ba(NO_3)_2$. Expressed generally, the metal or metal compound 50 shown in FIG. 2(A) is comprised of an oxide, hydroxide, carbonate, or nitrate. When this metal or metal compound 50 is placed in the exhaust gas, the majority of it becomes a nitrate.

When the amount of trapped $SO_x$ of the $SO_x$ trap catalyst 12 becomes greater, the exhaust gas flowing out from the $SO_x$ trap catalyst 12 contains $SO_x$. This $SO_x$ is trapped by the metal or metal compound 50 and, as shown in FIG. 2(A), changes to a metal compound 51 containing $SO_x$. When barium Ba is used, the metal compound 51 containing the $SO_x$ is barium sulfate $BaSO_4$. Therefore, when the metal or metal compound 50 is placed in the exhaust gas, as shown in FIG. 2(B), part of the barium nitrate $Ba(NO_3)_2$ of the metal compound 50 comprised of the barium nitrate $Ba(NO_3)_2$ changes to barium sulfate $BaSO_4$. Expressed generally, part of the nitrate changes to a sulfate. In this case, the ratio of the sulfate in the metal compound 51 becomes higher along with the elapse of time, that is, the higher the amount of trapped $SO_x$.

On the other hand, FIG. 2(C) shows the case where the metal or metal compound 50 is comprised of a precious metal or its compound. As this precious metal, palladium Pd, rhodium Rh, or platinum Pt can be used. As an example of FIG. 2(C), the case of use of palladium Pd is shown. In this case, if $SO_x$ is trapped, the metal oxide PdO changes to the sulfide PdS.

If the nitrate changes to a sulfate or if the metal oxide changes to a sulfide, its properties change. Accordingly, the amount of trapped $SO_x$ can be detected from the change in these properties. Therefore, in the present invention, when the amount of trapped $SO_x$ in the metal or metal compound 50 increases along with the elapse of time, a property of the metal or metal compound 50 changing along with the increase in the amount of trapped $SO_x$ is measured and the amount of trapped $SO_x$ is detected from the measured pr operty.

Next, referring to FIG. 3 to FIG. 6, the properties to be measured and the representative methods of detection corresponding to the properties to be measured will be explained. Note that FIG. 3 to FIG. 6 will be explained taking as an example the case of a nitrate changing to a sulfate as shown in FIG. 2(B).

Figure 3:
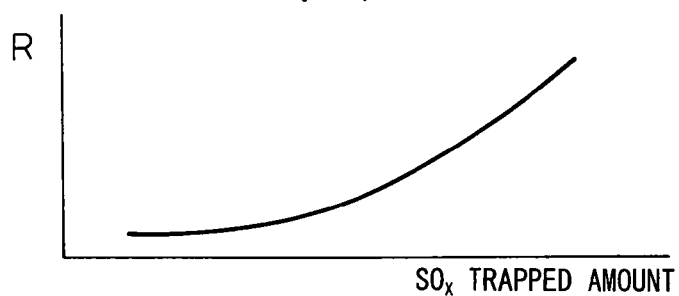
FIG. 3 is a view for explaining the method of detection of $SO_x$.
Figure 3:
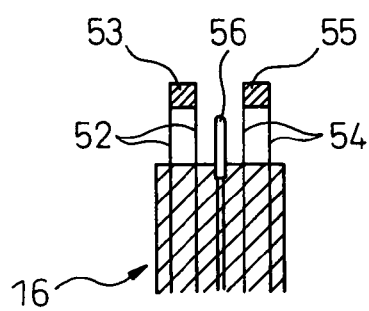
Figure 3:
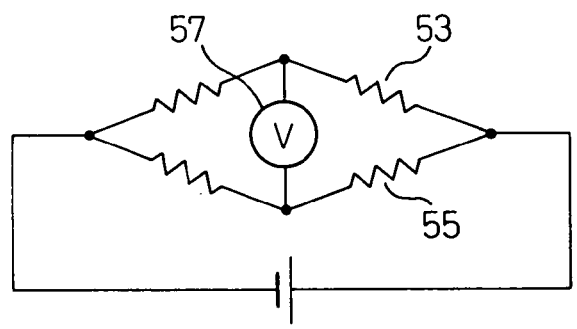
Figure 3:

FIG. 3 shows a case where the property to be measured is an electrical property and shows a case where the measured electrical property is the electric resistance.

FIG. 3(A) shows the relationship of the amount of trapped sulfur $SO_x$ and the electric resistance value R. As shown in FIG. 3(A), the more the amount of trapped $SO_x$ increases, that is, the greater the amount of change of nitrates to sulfates, the greater the change in the electric resistance value R. Accordingly, the amount of trapped $SO_x$ can be found from the electric resistance value R.

FIG. 3(B) shows the detection part of the $SO_x$ sensor 16 shown in FIG. 1. As shown in FIG. 3(B), the detection part of the $SO_x$ sensor 16 is comprised of a sensor part for detection 53 comprised of a metal compound piece supported by a pair of terminals 52 and a sensor part for reference 55 comprising a metal compound piece supported by a pair of terminals 54. Further, this detection part has a temperature sensor 56 arranged at it. In the example shown in FIG. 3(B), the sensor part for detection 53 is formed from an oxide, carbonate, or nitrate, while the sensor part for reference 55 is formed from a sulfate. When the exhaust gas flows, the sensor part for reference 55 will not change, but the sensor part for detection 53 changes to a nitrate when not a nitrate, then the $SO_x$ contained in the exhaust gas causes the nitrate to change to a sulfate little by little. Therefore, the amount of change of the electrical resistance value R of the sensor part for detection 53 gradually increases.

The electrical resistance value R of the sensor part for detection 53 becomes higher the higher the temperature of the surroundings. Therefore, the sensor part for reference 55 is provided to eliminate the effect of such a temperature change on the electrical resistance value R. For example, the Wheatstone bridge shown in FIG. 3(C) is used to find the amount of trapped $SO_x$ from the difference between the electrical resistance value of the sensor part for detection 53 and the electrical resistance value of the sensor part for reference 55. This Wheatstone bridge is provided inside the detection circuit 39 shown in FIG. 1. The voltage V appearing at the voltmeter 57 when using the Wheatstone bridge shown in FIG. 3(C), as shown in FIG. 3(D), falls as the amount of trapped $SO_x$ increases. This voltage V is input through an AD converter 37 to the input port 35.

Figure 4:
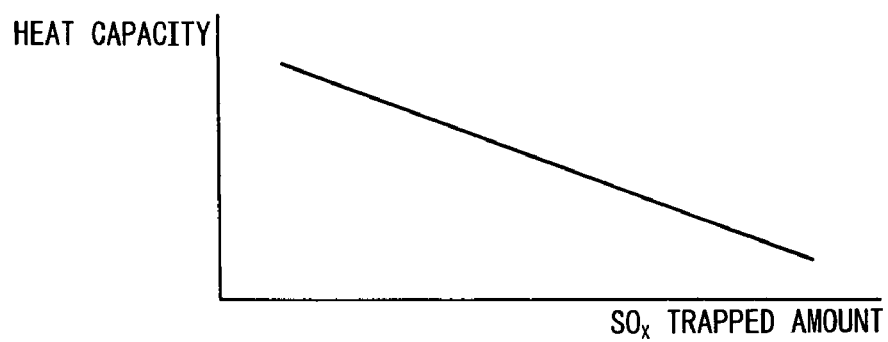
FIG. 4 is a view for explaining the method of detection of $SO_x$.
Figure 4:
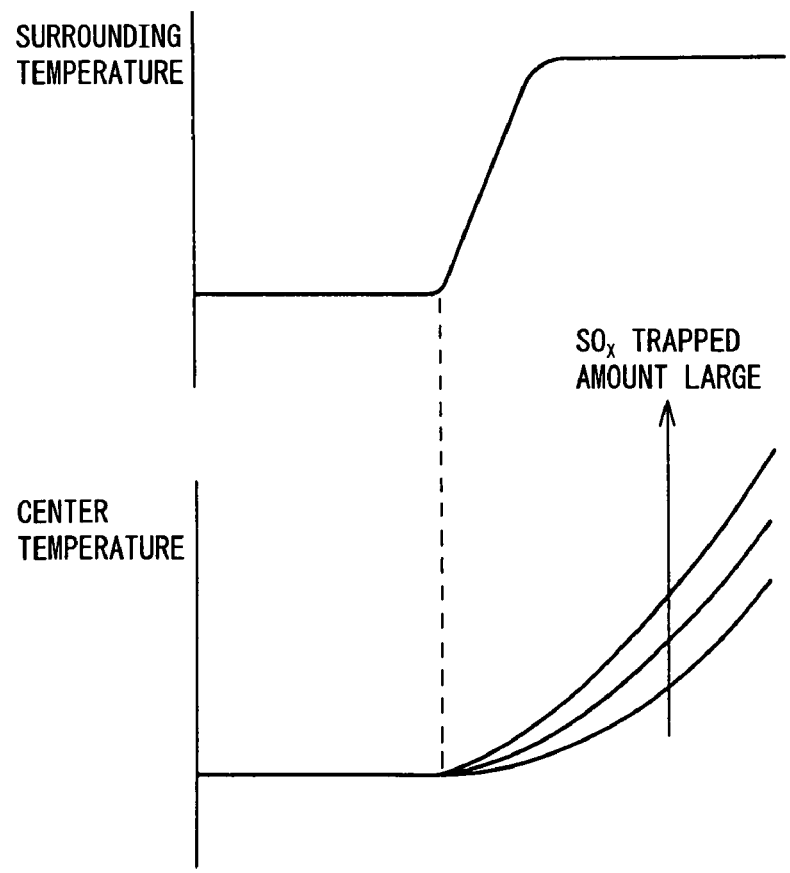
Figure 5:
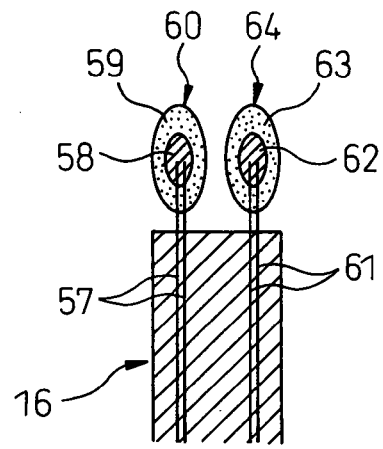
FIG. 5 is a view for explaining the method of detection of $SO_x$.
Figure 5:
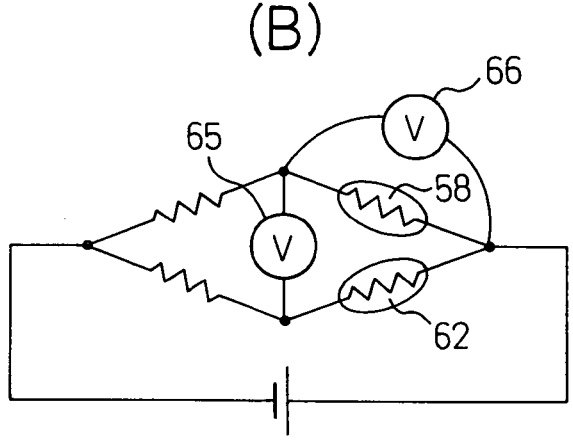
Figure 5:
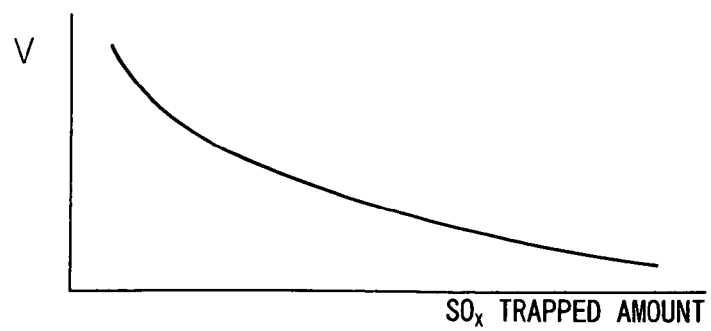

FIG. 4 and FIG. 5 show cases where the measured property is a thermal property and where the measured thermal property is the heat capacity and thermal conductivity.

As shown in FIG. 4(A), the more the amount of trapped $SO_x$ increases, the more the heat capacity of the metal compound piece forming the sensor part decreases. Accordingly, as shown in FIG. 4(B), when the temperature around the sensor part rises, the rate of increase of the center temperature of the sensor part rises the more the amount of trapped sulfur $SO_x$ increases.

FIG. 5(A) shows the detection part of the $SO_x$ sensor 16. In the example shown in FIG. 5(A), a thermistor element 58 having a pair of lead wires 57 and a thermistor element 62 having a pair of lead wires 61 are arranged. Further, in this example, the surroundings of the thermistor element 58 are surrounded by a metal compound 59 to form a sensor part for detection 60, and the surroundings of the thermistor element 62 are surrounded by a metal compound 63 to form a sensor part for reference 64.

In this example, the heat capacity of the metal compound 59 is estimated from the response of the change in the resistance value of the thermistor element 58 when the temperature around the sensor part for detection 60 changes, the heat capacity of the metal compound 63 is estimated from the response of the change in the resistance value of the thermistor element 62 when the temperature around the sensor part for reference 64 changes, and the amount of trapped $SO_x$ is found from the difference of these heat capacities.

That is, specifically, a Wheatstone bridge such as shown in FIG. 5(B) is used to find the difference between the resistance of the thermistor element 58 and the resistance of the thermistor element 62 in the form of voltage. In this case, the voltage V of the voltmeter 65 showing the difference of resistance values falls, as shown in FIG. 5(C), the more the $SO_x$ trapped at the sensor part for detection 60 increases. Note that in this example, as shown in FIG. 5(B), the voltmeter 66 is used to detect the temperature of the sensor part for detection 60.

Figure 6:
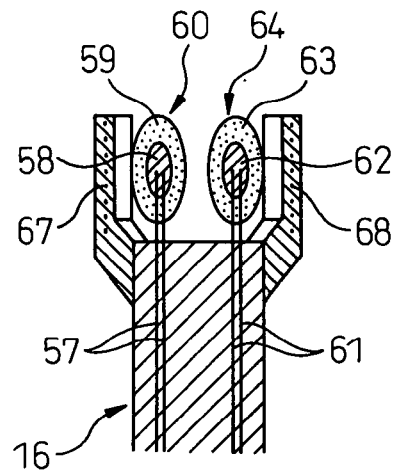
FIG. 6 is a side cross-sectional view showing another embodiment of an $SO_x$ sensor.

On the other hand, in the example shown in FIG. 6, the sensor part for detection 60 and the sensor part for reference 64 are respectively provided with heaters 67 and 68 for heating. In this example, by operating the heaters 67 and 68, it is possible to raise the temperatures of the sensor parts 60 and 64 to any temperatures. Further, in this example, even when the temperature of the surroundings changes, these heaters 67 and 68 can be operated to find the difference in heat capacities of the metal compound 59 and the metal compound 63.

Further, if making the sensor part for detection 60 a high temperature, the sensor part for detection 60 releases the trapped $SO_x$ and the sensor part for detection 60 is regenerated. Therefore, in this example, the heater 67 can be operated to raise the temperature of the sensor part for detection 60 and thereby regenerate the sensor part for detection 60. Note that in this case, even if making the air-fuel ratio of the exhaust gas temporarily rich, the sensor part for detection 60 can be regenerated.

Now, if the $SO_x$ trapping rate of the $NO_x$ storing catalyst 14 and the $SO_x$ trapping rate of the sensor part 53, 60 of the $SO_x$ sensor 16 are both equal, for example, are both 100 percent, the amount of $SO_x$ trapped and stored at the $NO_x$ storing catalyst 14 is proportional to the amount of $SO_x$ trapped at the sensor part 53, 60 of the $SO_x$ sensor 16. Therefore, in this case, by multiplying the amount of $SO_x$ trapped at the sensor part 53, 60 of the $SO_x$ sensor 16 by a predetermined power C found by experiments, the amount of $SO_x$ stored in the $NO_x$ storing catalyst 14 can be estimated.

Figure 7:
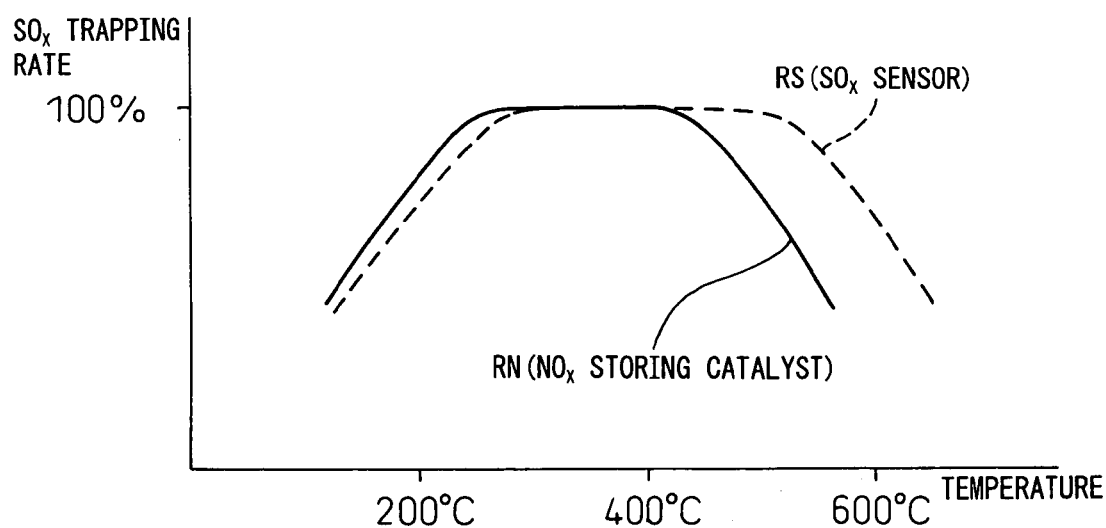
FIG. 7 is a view showing $SO_x$ trapping rates of an $NO_x$ storing catalyst and a sensor part of an $SO_x$ sensor.
Figure 8:
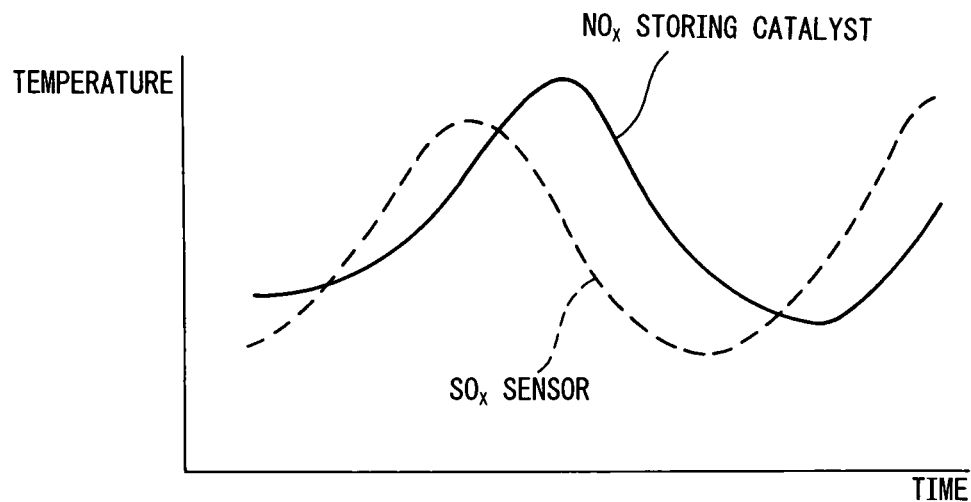
FIG. 8 is a view showing the change in temperatures of an $NO_x$ storing catalyst and a sensor part of an $SO_x$ sensor.

However, in fact, as shown in FIG. 7, the $SO_x$ trapping rate RN of the $NO_x$ storing catalyst 14 changes in accordance with the temperature of the $NO_x$ storing catalyst 14 (abscissa of FIG. 7) and the $SO_x$ trapping rate RS of the sensor part 53, 60 of the $SO_x$ sensor 16 changes in accordance with the temperature of the sensor part 53, 60 (abscissa of FIG. 7). Further, the $SO_x$ sensor 16 changes quickly in response to changes in the exhaust temperature since it has a smaller heat capacity than the $NO_x$ storing catalyst 14. Further, to release $NO_x$, the heat of oxidation reaction of the reducing agent fed from the reducing agent feed valve 15 causes the $NO_x$ storing catalyst 14 to become somewhat higher in temperature than the $SO_x$ sensor 16, so the temperature of the $NO_x$ storing catalyst 14 and the temperature of the $SO_x$ sensor 16 usually become different temperatures as shown in FIG. 8.

Therefore, usually the $SO_x$ trapping rate RN of the $NO_x$ storing catalyst 14 and the $SO_x$ trapping rate RS of the sensor part 53, 60 of the $SO_x$ sensor 16 differ. Therefore, in this case, even if multiplying the amount of $SO_x$ trapped in the sensor part 53, 60 of the $SO_x$ sensor 16 by a predetermined power C without considering the difference in the $SO_x$ trapping rates, deviation occurs between the estimated value of the amount of $SO_x$ stored in the $NO_x$ storing catalyst 14 and the actually stored amount of $SO_x$.

Therefore, in the present invention, deviation correcting means for correcting the deviation of the estimated value of the amount of stored $SO_x$ arising due to the difference between the $SO_x$ trapping rate of the sensor part 53, 60 and the $SO_x$ trapping rate of the $NO_x$ storing catalyst 14 when estimating the amount of $SO_x$ stored in the $NO_x$ storing catalyst 14 from the amount of $SO_x$ trapped at the sensor part 53, 60 of the $SO_x$ sensor 16 is provided.

Next, a first embodiment of this deviation correcting means will be explained.

As explained above, if the $SO_x$ trapping rate RN of the $NO_x$ storing catalyst 14 and the $SO_x$ trapping rate RS of the sensor parts 53, 60 of the $SO_x$ sensor 16 are made equal, the amount of $SO_x$ trapped and stored at the $NO_x$ storing catalyst 14 becomes proportional to the amount of $SO_x$ trapped at the sensor part 53, 60 of the $SO_x$ sensor 16. Therefore, in this case, by multiplying the amount of $SO_x$ trapped at the sensor part 53, 60 of the $SO_x$ sensor 16 by a predetermined power C, it is possible to estimate the amount of $SO_x$ stored in the $NO_x$ storing catalyst 14.

Therefore, in the first embodiment of the deviation correcting means, as the $SO_x$ sensor 16, an $SO_x$ sensor with a heater shown in FIG. 6 is used and the temperature of the sensor part 60 is controlled so that the $SO_x$ trapping rate RS of the sensor part 60 of the $SO_x$ sensor 16 and the $SO_x$ trapping rate RN of the $NO_x$ storing catalyst 14 become equal so as to correct the deviation.

Specifically speaking, when the temperature of the sensor part 60 of the $SO_x$ sensor 16 falls below the target temperature where the $SO_x$ trapping rates of the sensor part 60 and $NO_x$ storing catalyst 14 are made equal, the heaters 67 and 68 are operated. Next, referring to FIG. 9 and FIG. 10, the target temperature To for operating the heaters 67 and 68 will be explained.

Figure 9:
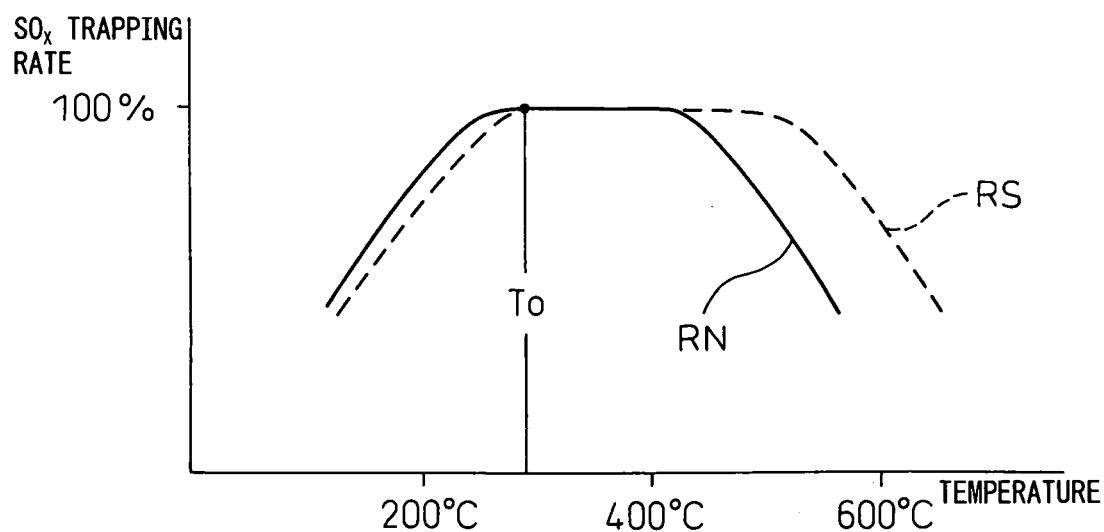
FIG. 9 is a view showing $SO_x$ trapping rates of an $NO_x$ storing catalyst and a sensor part of an $SO_x$ sensor.
Figure 10:
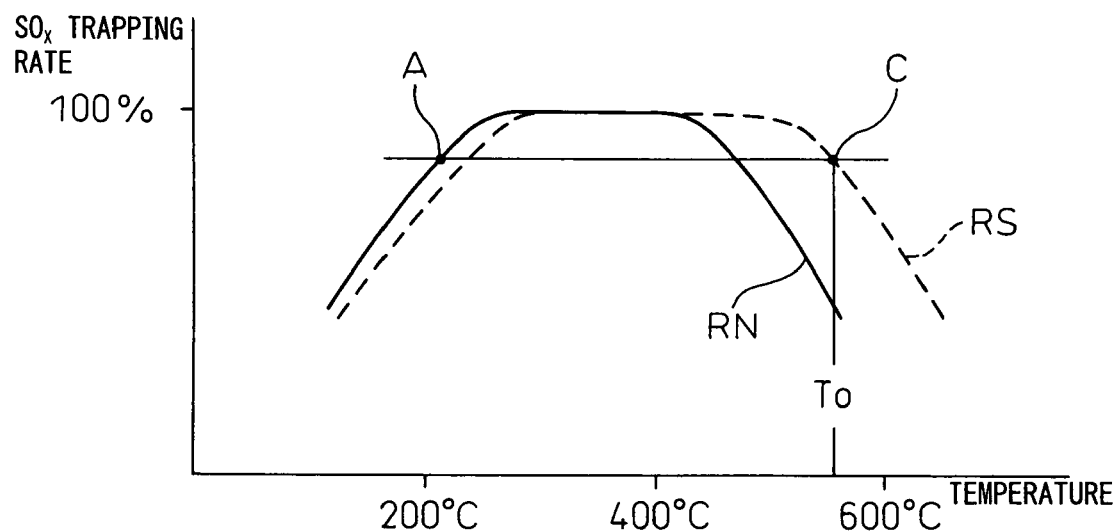
FIG. 10 is a view showing $SO_x$ trapping rates of an $NO_x$ storing catalyst and a sensor part of an $SO_x$ sensor.
Figure 10:
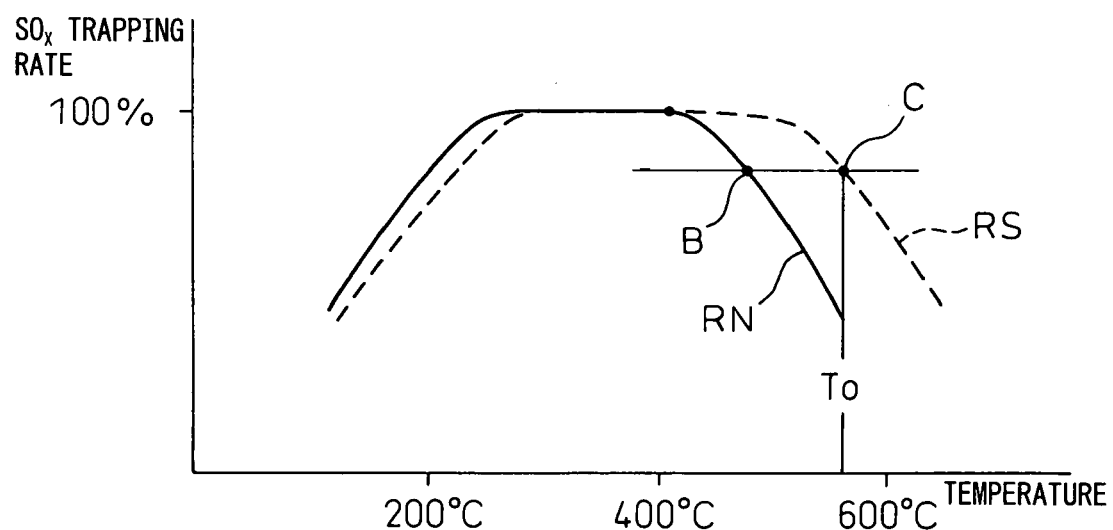

FIG. 9 shows the case where the $SO_x$ trapping rate RN of the $NO_x$ storing catalyst 14 is a peak value of substantially 100%. In this case, the lowest temperature among the temperatures of the sensor part 60 where the $SO_x$ trapping rate of the sensor part 60 of the $SO_x$ sensor 16 becomes the peak value is made the target temperature To. When the temperature of the sensor part 60 falls below this target temperature To, the heaters 67 and 68 are turned on and the temperature of the sensor part 60 is made to rise to the target temperature To.

FIG. 10(A) shows the case shown by the point A where the $SO_x$ trapping rate RN of the $NO_x$ storing catalyst 14 is lower than the peak value, while FIG. 10(B) shows the case shown by the point B where the $SO_x$ trapping rate RN of the $NO_x$ storing catalyst 14 is lower than the peak value. In each case, the temperature of the sensor part 53, 60 at the point C where it is higher than the temperature of the $NO_x$ storing catalyst 14 and the $SO_x$ trapping rate RN of the $NO_x$ storing catalyst 14 and the $SO_x$ trapping rate RS become equal is made the target temperature To. When the temperature of the sensor part 60 falls below this target temperature To, the heaters 67 and 68 are turned on and the temperature of the sensor part 60 is raised to the target temperature To.

Figure 11:
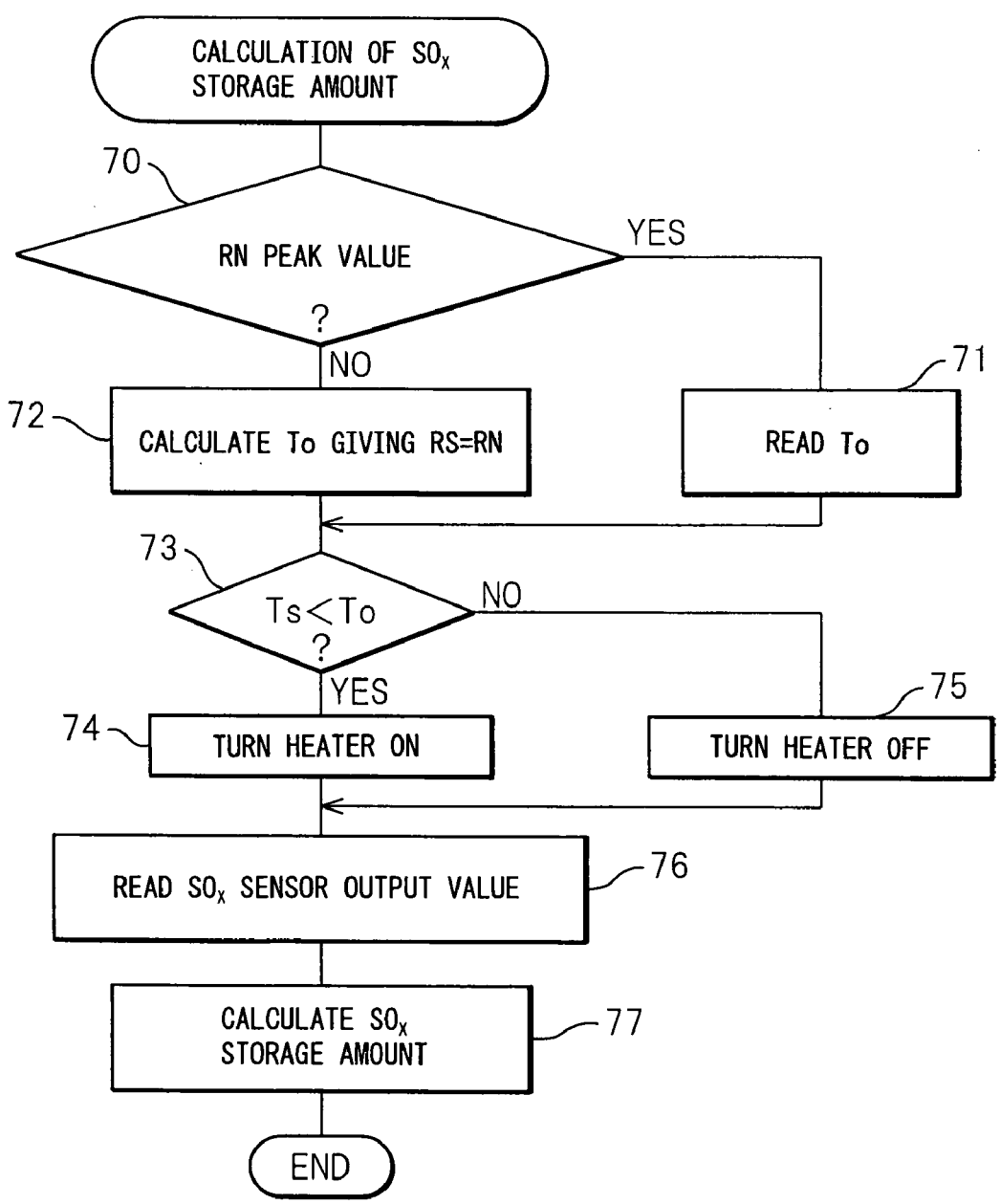
FIG. 11 is a flow chart for calculating the amount of $SO_x$ stored in the $NO_x$ storing catalyst.

FIG. 11 shows a routine for calculation of the stored amount of $SO_x$ of the $NO_x$ storing catalyst 14.

Referring to FIG. 11, first, at step 70, it is judged if the $SO_x$ trapping rate RN of the $NO_x$ storing catalyst 14 is a peak value of substantially 100 percent. When the $SO_x$ trapping rate RN is the peak value, the routine proceeds to step 71 where the target temperature To shown in FIG. 9 is read, then the routine proceeds to step 73. As opposed to this, when the $SO_x$ trapping rate RN is not the peak value, the routine proceeds to step 72 where the target temperature To at the point of FIGS. 10(A) and (B) where the $SO_x$ trapping rate RS becomes equal to the $SO_x$ trapping rate RN is calculated. Next, the routine proceeds to step 73.

At step 73, it is judged if the temperature Ts of the sensor part 60 of the $SO_x$ sensor 16 has become lower than a target temperature To. When Ts≧To, the routine proceeds to step 75 where the heaters 67 and 68 are turned off, then the routine proceeds to step 76. As opposed to this, when Ts<To, the routine proceeds to step 74 where the heaters 67 and 68 are turned on, then the routine proceeds to step 76. At step 76, the output value V of the $SO_x$ sensor 16 is read. At step 77, the stored amount of $NO_x$ of the $NO_x$ storing catalyst 14 is calculated from this output value V.

Next, a second embodiment of the above-mentioned deviation correcting means will be explained.

In this embodiment, to prevent deviation between the estimated value of the amount of $SO_x$ stored at the $NO_x$ storing catalyst 14 and the actual amount of stored $SO_x$, the embodiment corrects up or corrects down the estimated value of the stored amount of $SO_x$ of the $NO_x$ storing catalyst 14 in accordance with the $SO_x$ trapping rates of said sensor part 53, 60 and $NO_x$ storing catalyst so that deviation does not occur.

Figure 12:
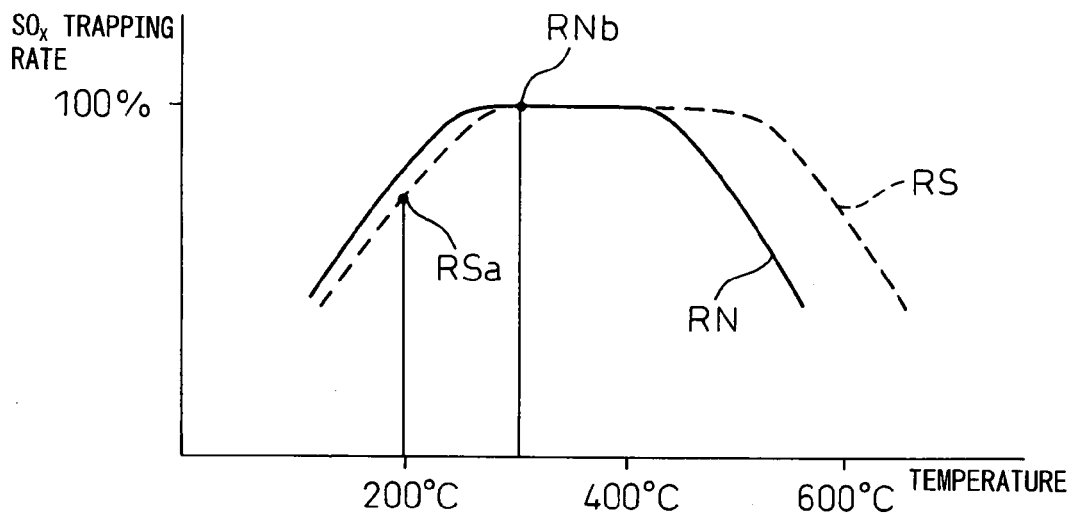
FIG. 12 is a view showing the $SO_x$ trapping rates of an $NO_x$ storing catalyst and a sensor part of an $SO_x$ sensor.

That is, for example, in FIG. 12, assume that the temperature of the sensor part 53, 60 of the $SO_x$ sensor 16 is 200° C. and the $SO_x$ trapping rate RS is RSa and, on the other hand, the temperature of the $NO_x$ storing catalyst 14 is 300° C. and the $SO_x$ trapping rate RN is RNb. At this time, when estimating the amount of $SO_x$ stored per unit time in the $NO_x$ storing catalyst 14 based on the amount of $SO_x$ trapped per unit time in the sensor part 53, 60, the amount of stored $SO_x$ becomes RNb/RSa times the amount of $SO_x$ stored in the $NO_x$ storing catalyst per unit time when the $SO_x$ trapping rates RN and RS are equal.

That is, as explained above, when the $SO_x$ trapping rates of the sensor part 53, 60 of the $SO_x$ sensor 16 and the $NO_x$ storing catalyst 14 are equal, the estimated value of the amount of $SO_x$ stored at the $NO_x$ storing catalyst 14 can be obtained by multiplying the amount of $SO_x$ trapped at the sensor part 53, 60 by the predetermined power C. As opposed to this, when the $SO_x$ trapping rates of the sensor part 53, 60 and $NO_x$ storing catalyst 14 differ, the estimated value of the amount of $SO_x$ stored at the $NO_x$ storing catalyst 14 is obtained by multiplying the amount of $SO_x$ trapped at the sensor 53, 60 by the predetermined power C and the $SO_x$ trapping rate RS of the $SO_x$ trapping rate RN of the $NO_x$ storing catalyst 14/$SO_x$ trapping rate RS of the sensor part 53, 60.

Figure 13:
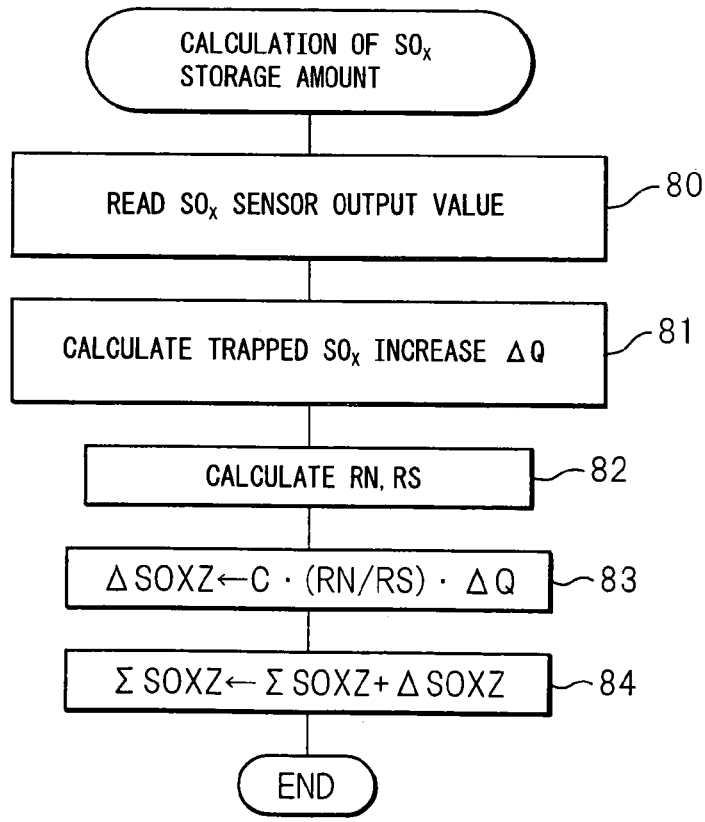
FIG. 13 is a flow chart for calculating the amount of $SO_x$ stored in the $NO_x$ storing catalyst.

FIG. 13 shows a routine for calculation of the amount of $SO_x$ stored in the $NO_x$ storing catalyst 14. Note that this routine is executed by interruption every certain time interval.

If referring to FIG. 13, first, at step 80, the output value V of the $SO_x$ sensor 16 is read. Next, at step 81, the increase $\Delta Q$ per unit time of the amount of $SO_x$ trapped at the sensor part 53, 60 is calculated from the difference between the output value V of the $SO_x$ sensor 16 at the previous processing cycle and the output value V of the $SO_x$ sensor 16 at the current processing cycle.

Next, at step 82, the $SO_x$ trapping rate RN of the $NO_x$ storing catalyst 14 and the $SO_x$ trapping rate RS of the sensor part 53, 60 of the $SO_x$ sensor 16 are calculated from the relationship shown in FIG. 7 based on the temperature of the $NO_x$ storing catalyst 14 and the temperature of the sensor part 53, 60 of the $SO_x$ sensor 16. Next, at step 83, the amount of $SO_x$ $\Delta SOXZ$ stored in the $NO_x$ storing catalyst 14 per unit time is calculated by multiplying the trapped $SO_x$ increase $\Delta Q$ by the predetermined power C and the RN/RS. Next, at step 84, this $SO_x$ amount $\Delta SOXZ$ is added to the $\Sigma SOXZ$ to calculate the amount of $SO_x$ $\Sigma SOXZ$ stored in the $NO_x$ storing catalyst 14.

LIST OF REFERENCE NOTATIONS

5 ... exhaust manifold
12 ... $SO_x$ trap catalyst
14 ... $NO_x$ storing catalyst
15 ... reducing agent feed valve
16 ... $SO_x$ sensor
53, 60 ... sensor part for detection
55, 64 ... sensor part for reference

The invention claimed is:

1. An exhaust purification device of internal combustion engine arranging a catalyst in which $SO_x$ contained in an exhaust gas is trapped and stored in an engine exhaust passage, wherein an $SO_x$ sensor having a sensor part trapping $SO_x$ contained in exhaust gas and able to detect an amount of $SO_x$ trapped at the sensor part from a change in a physical property of the sensor part is arranged in the engine exhaust passage upstream of the catalyst, and deviation correcting means for correcting deviation of an estimated value of a stored amount of $SO_x$ arising due to a difference in an $SO_x$ trapping rate of the sensor part and an $SO_x$ trapping rate of the catalyst when estimating the amount of $SO_x$ stored in the catalyst from the amount of $SO_x$ trapped at the sensor part is provided.

2. An exhaust purification device of internal combustion engine as claimed in claim 1, wherein a property of said sensor part changing due to the amount of trapped $SO_x$ is an electrical property represented by an electrical resistance or thermal property represented by a heat capacity and a thermal conductivity.

3. An exhaust purification device of internal combustion engine as claimed in claim 1, wherein said sensor part is comprised of a sensor part for detection changing to a sulfate when trapping $SO_x$ and a sensor part for reference originally made a sulfate.

4. An exhaust purification device of internal combustion engine as claimed in claim 1, wherein said catalyst is comprised of an $NO_x$ storing catalyst storing $NO_x$ contained in the exhaust gas when an air-fuel ratio of an inflowing exhaust gas is lean and releases stored $NO_x$ when the air-fuel ratio of the inflowing exhaust gas becomes a stoichiometric air-fuel ratio or rich.

5. An exhaust purification device of internal combustion engine as claimed in claim 1, wherein an $SO_x$ trap catalyst able to trap $SO_x$ contained in the exhaust gas is arranged in the engine exhaust passage upstream of said catalyst.

6. An exhaust purification device of internal combustion engine as claimed in claim 1, wherein said deviation correcting means corrects the deviation by controlling a temperature of said sensor part so that the $SO_x$ trapping rate of said sensor part and the $SO_x$ trapping rate of said catalyst becomes equal.

7. An exhaust purification device of internal combustion engine as claimed in claim 6, wherein a heater for heating said sensor part is provided, and, said heater is operated when the temperature of said sensor part falls below a temperature making the $SO_x$ trapping rates of said sensor part and said catalyst equal.

8. An exhaust purification device of internal combustion engine as claimed in claim 1, wherein said deviation correcting means corrects up or corrects down the estimated value of the stored amount of $SO_x$ of said catalyst in accordance with the $SO_x$ trapping rates of said sensor part and said catalyst so that the deviation does not occur.

9. An exhaust purification device of internal combustion engine as claimed in claim 8, wherein when the $SO_x$ trapping rates of said sensor part and said catalyst are equal, the estimated value of the stored amount of $SO_x$ of said catalyst is obtained by multiplying the amount of $SO_x$ trapped at said sensor part by a predetermined power, and, when the $SO_x$ trapping rates of said sensor part and catalyst differ, the estimated value of the stored amount of $SO_x$ of said catalyst is obtained by multiplying the amount of $SO_x$ trapped at said sensor part by a predetermined power and a $SO_x$ trapping rate of the catalyst/$SO_x$ trapping rate of the sensor part.

10. An exhaust purification device of internal combustion engine as claimed in claim 1, wherein said sensor part is comprised of a metal compound changing to a sulfate when trapping $SO_x$.

11. An exhaust purification device of internal combustion engine as claimed in claim 10, wherein said metal compound is comprised of a compound of an alkali metal, alkali earth metal, rare earth metal, or precious metal.

* * * * *